Sept. 15, 1925.
E. N. WEYER
1,554,054
ENVELOPE MAILING AND STAMPING MACHINE
Filed Nov. 14, 1921
9 Sheets-Sheet 1
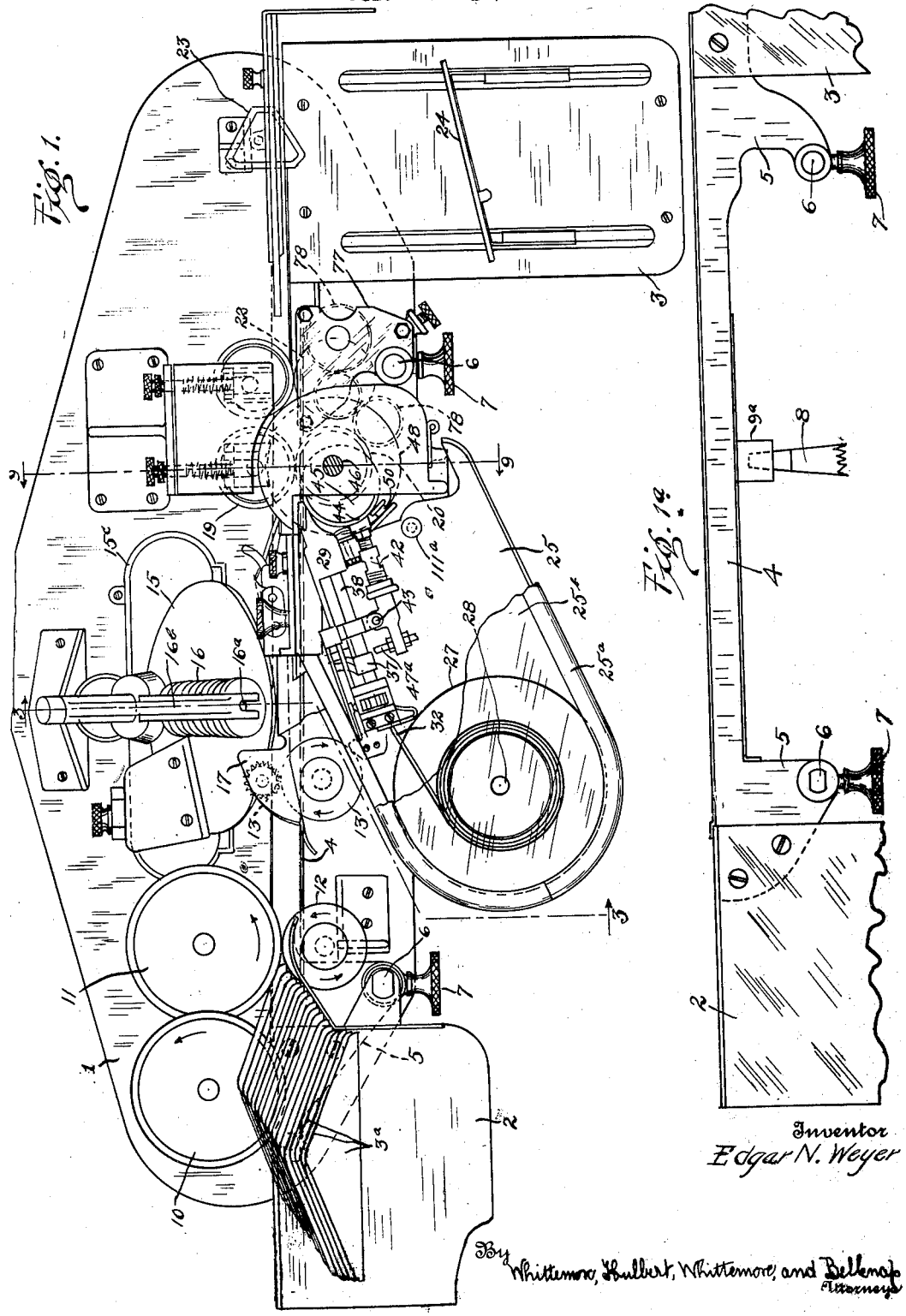
Inventor
Edgar N. Weyer
By Whittemore, Hulbert, Whittemore, and Belknap
Attorneys

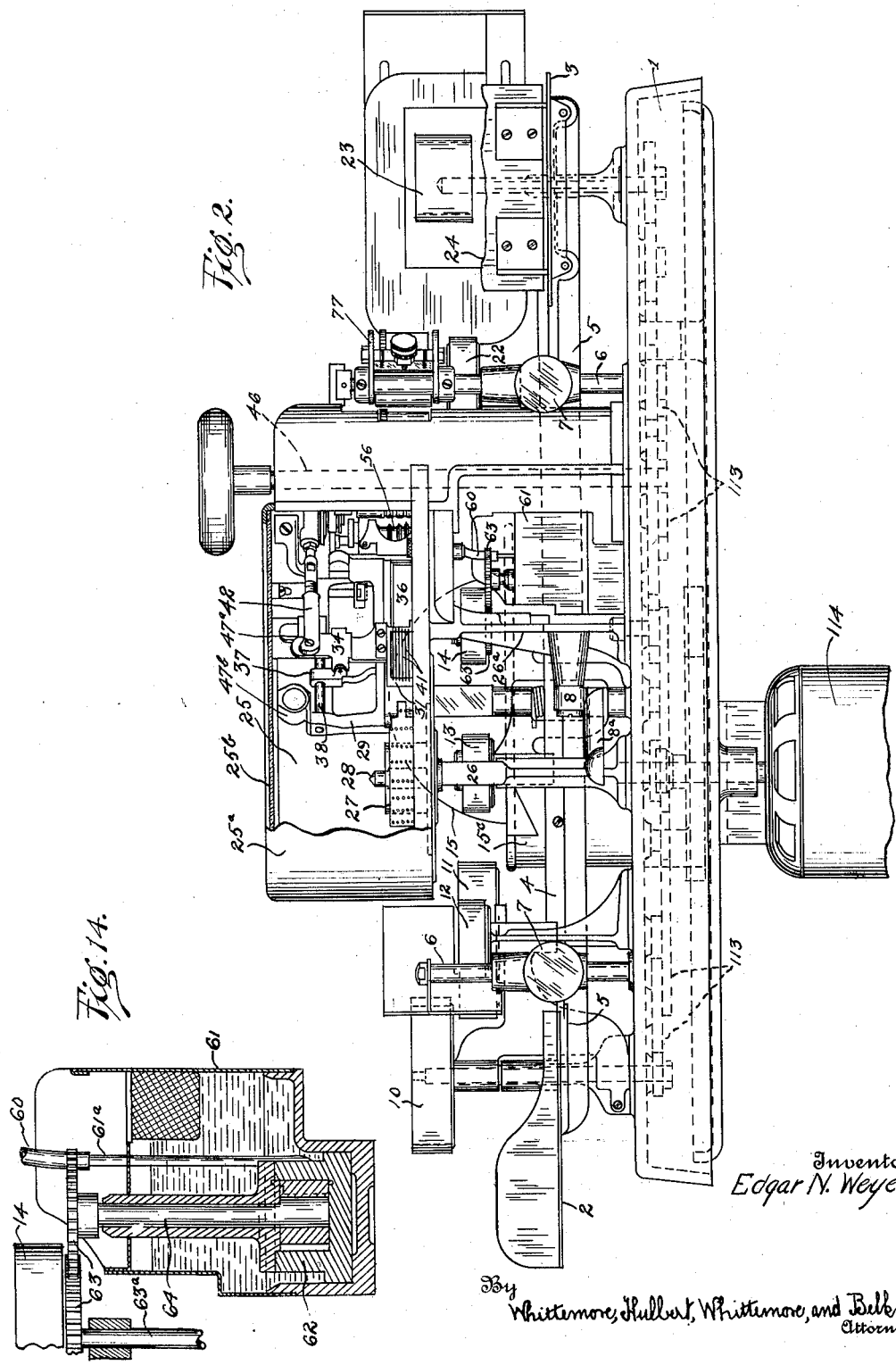

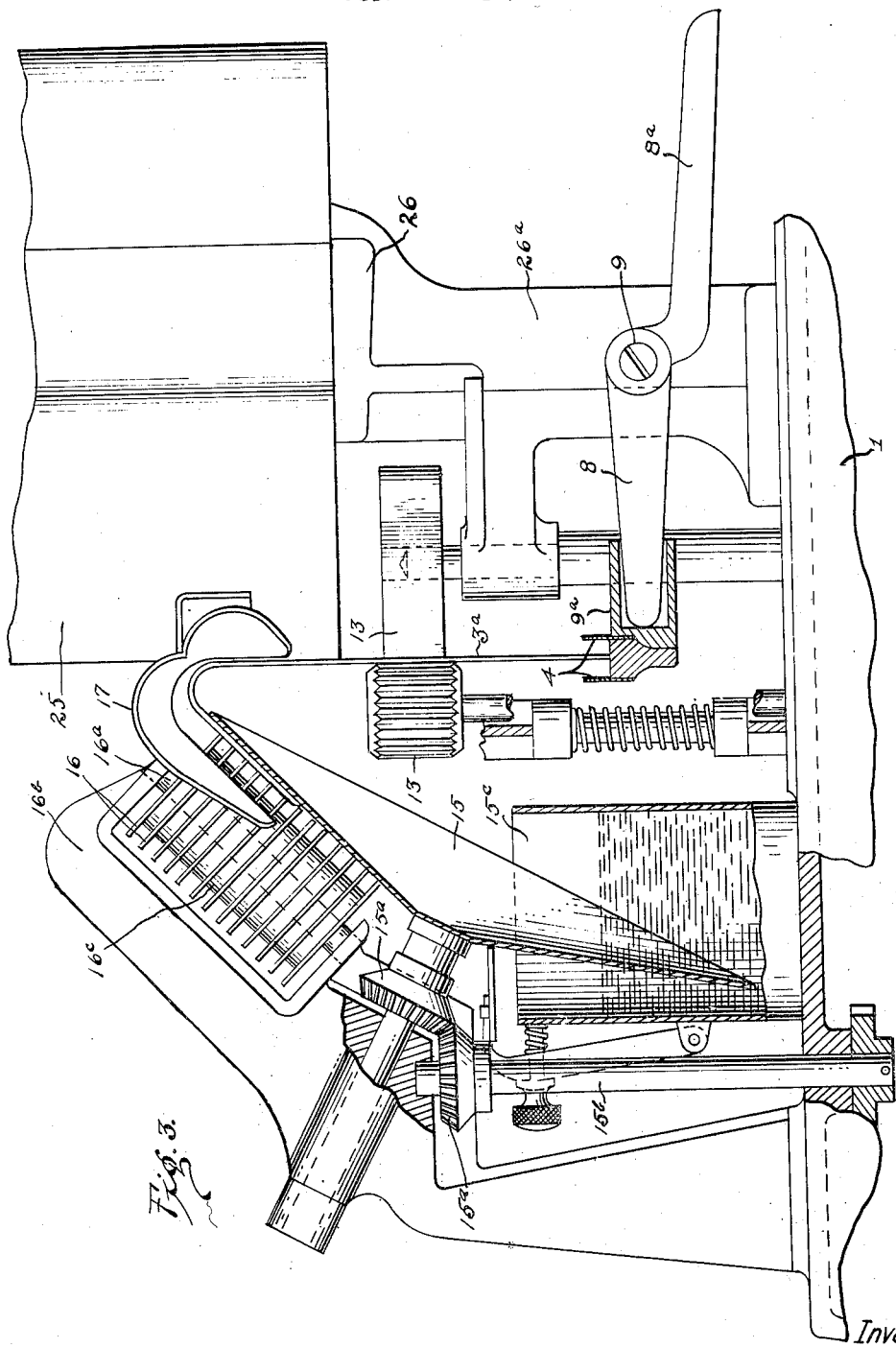

Sept. 15, 1925. 1,554,054
E. N. WEYER
ENVELOPE MAILING AND STAMPING MACHINE
Filed Nov. 14, 1921 9 Sheets-Sheet 4
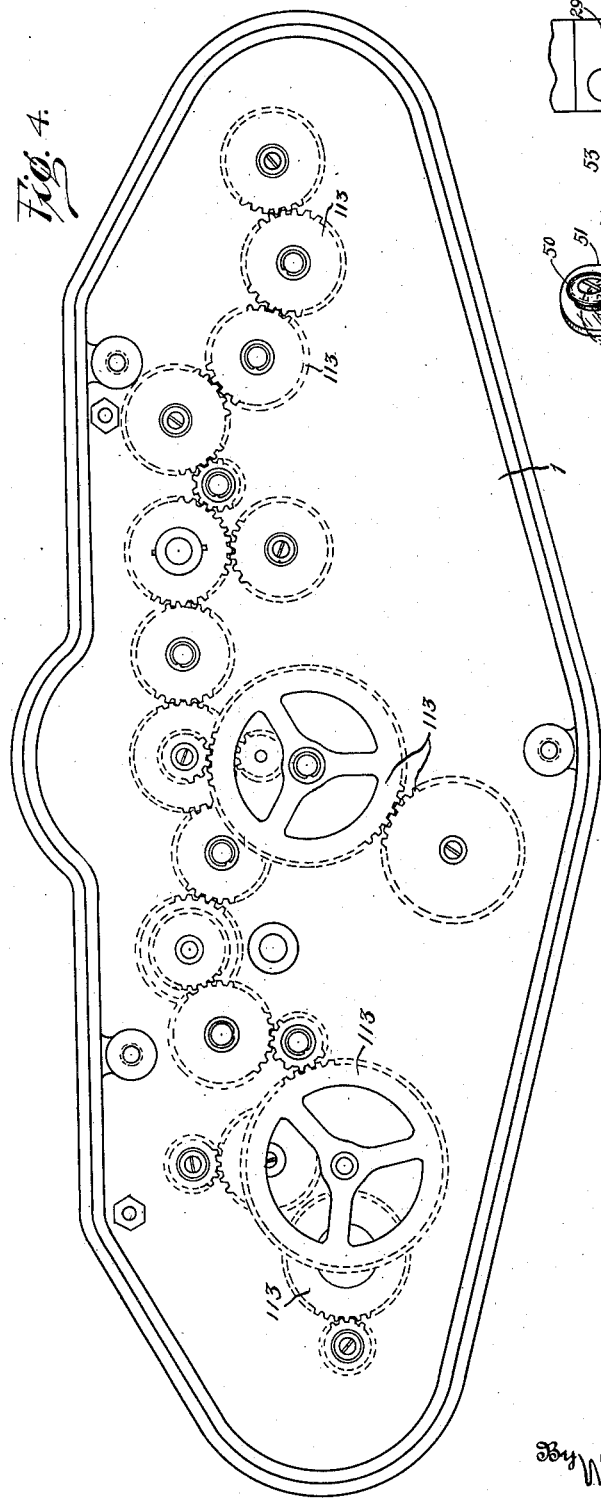
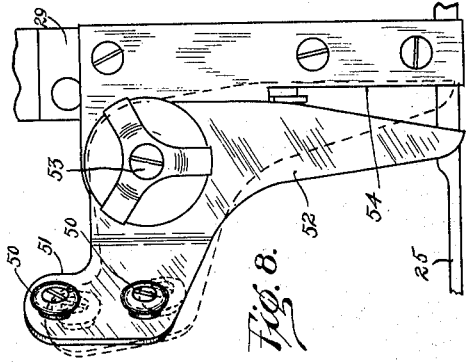
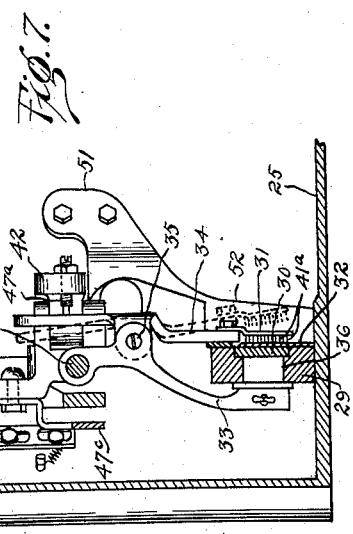
Inventor
Edgar N. Weyer
By Whittemore, Hulbert, Whittemore, and Belknap
Attorneys Sept. 15, 1925.  
E. N. WEYER  
1,554,054  
ENVELOPE MAILING AND STAMPING MACHINE  
Filed Nov. 14, 1921  
9 Sheets-Sheet 5
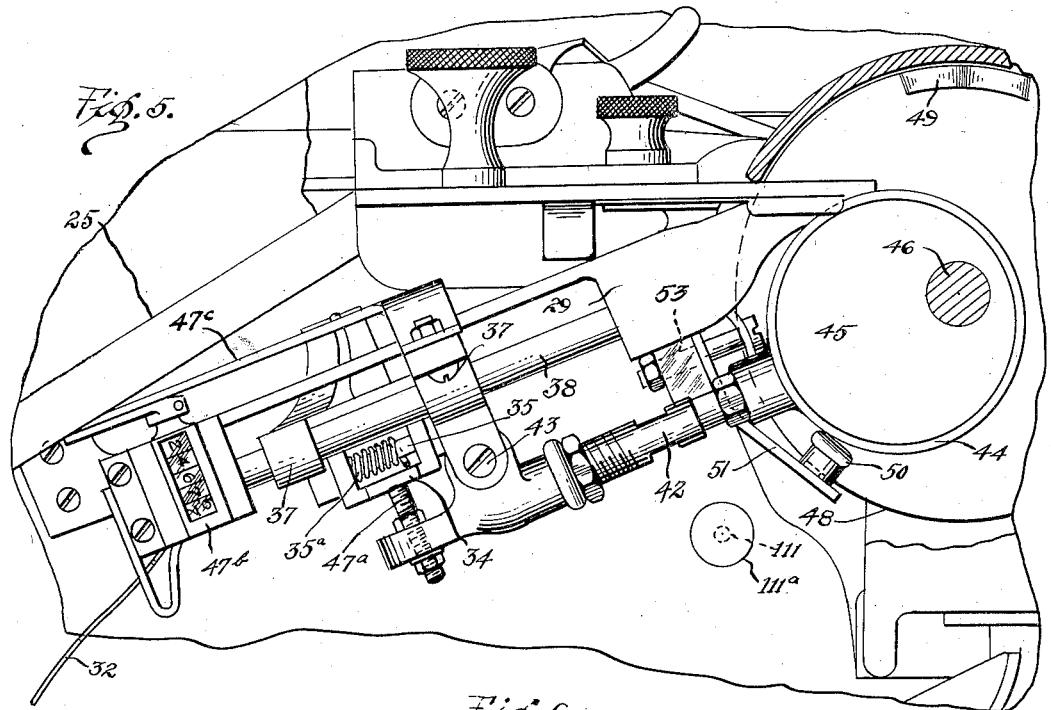
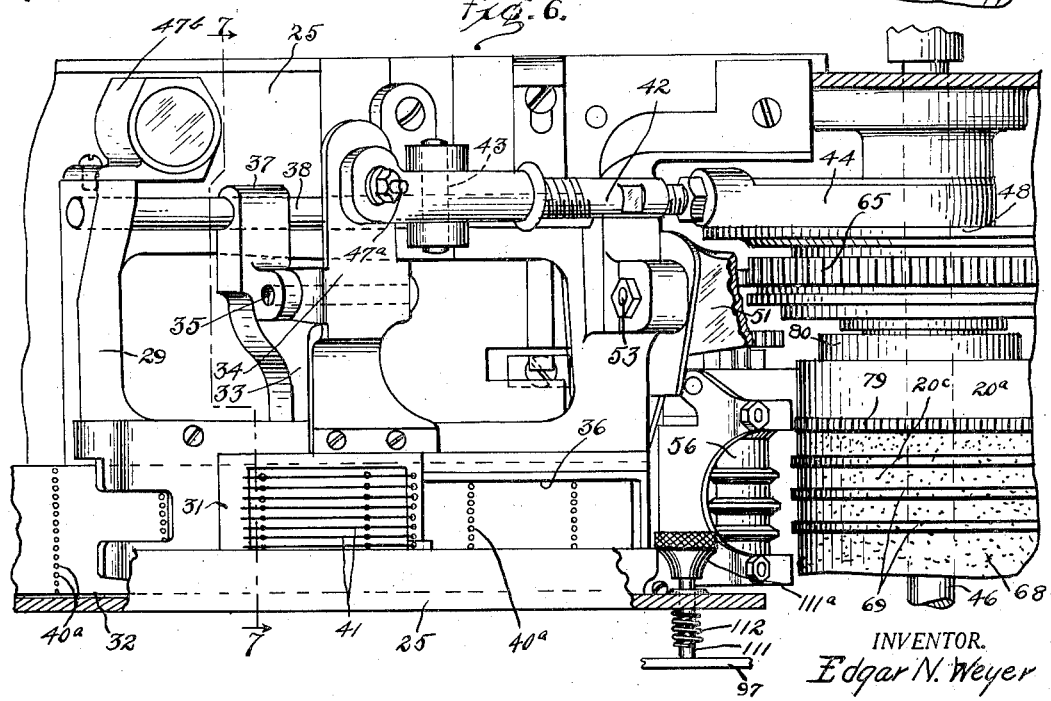
INVENTOR.  
*Edgar N. Weyer*  
BY  
Whittemore, Hulbert, Whittemore, and Belknap  
ATTORNEYS.

Sept. 15, 1925.
E. N. WEYER
1,554,054
ENVELOPE MAILING AND STAMPING MACHINE
Filed Nov. 14, 1921
9 Sheets-Sheet 6
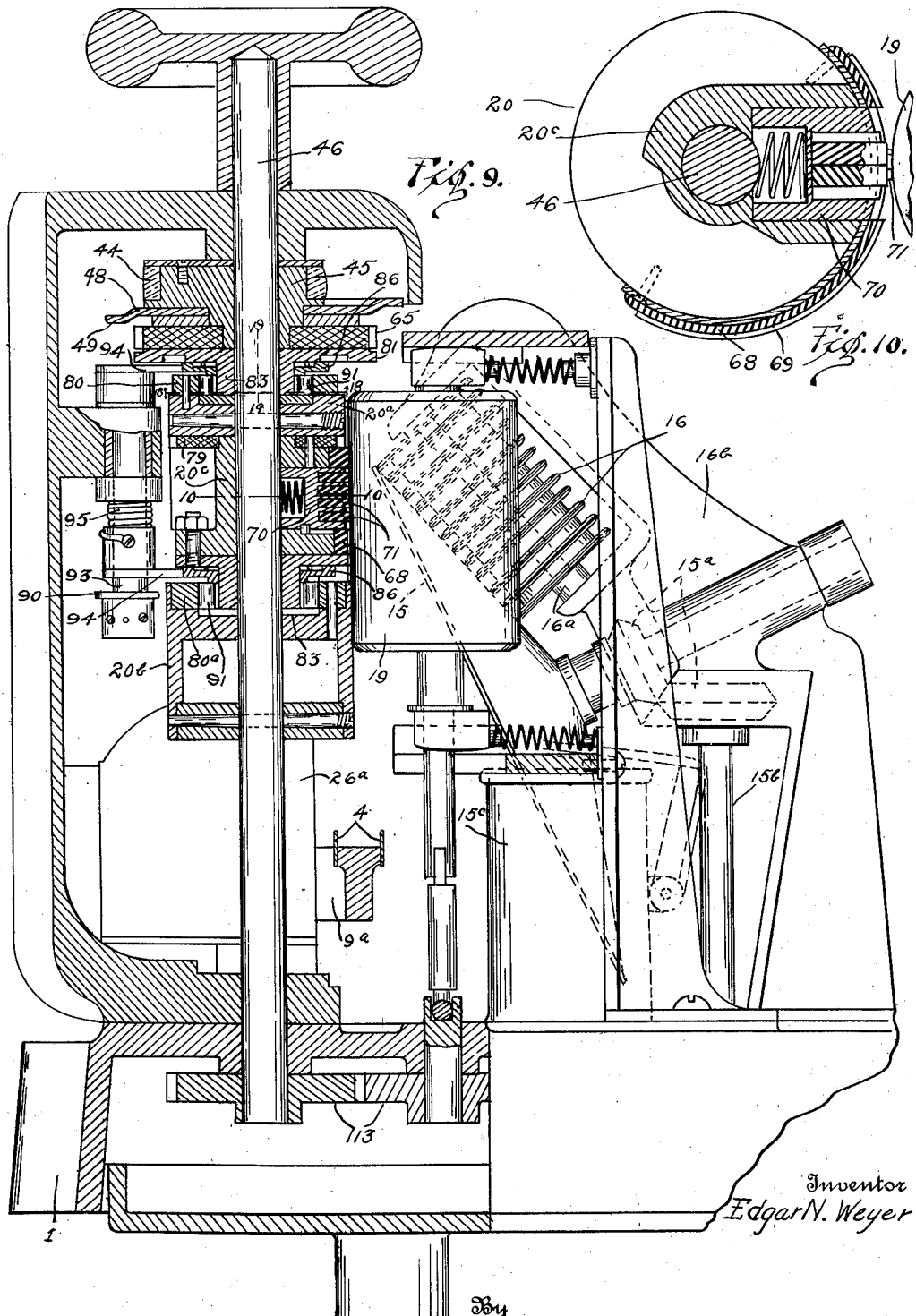
Inventor
Edgar N. Weyer
By
Whittemore, Hulbert, Whittemore, and Belknap
Attorneys Sept. 15, 1925.
E. N. WEYER
1,554,054
ENVELOPE MAILING AND STAMPING MACHINE
Filed Nov. 14, 1921 9 Sheets-Sheet 7
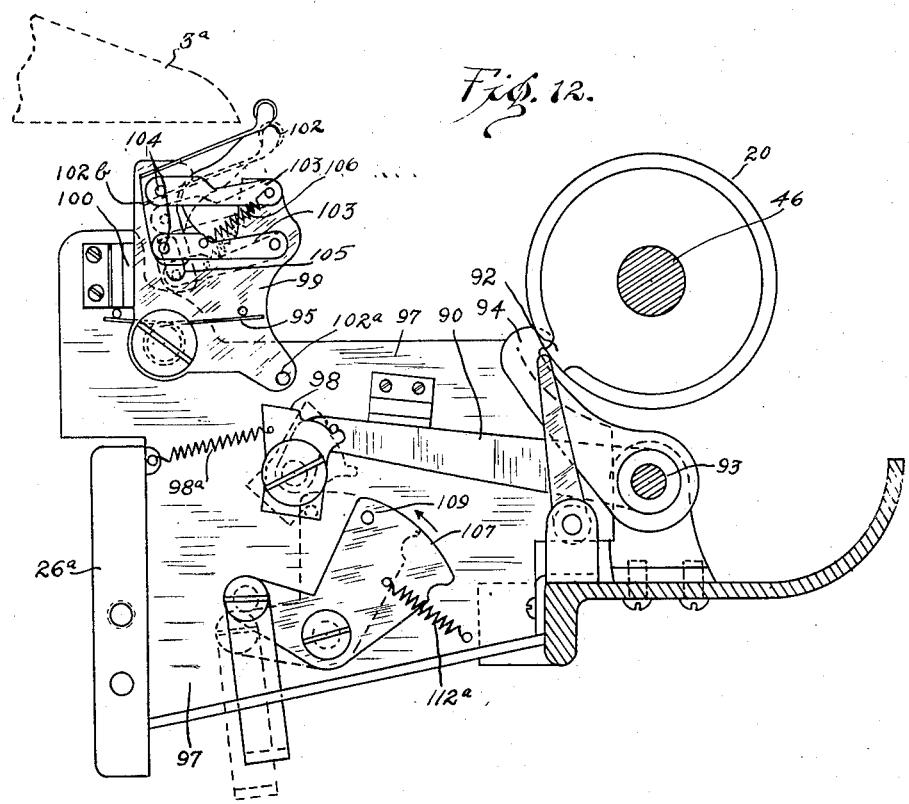
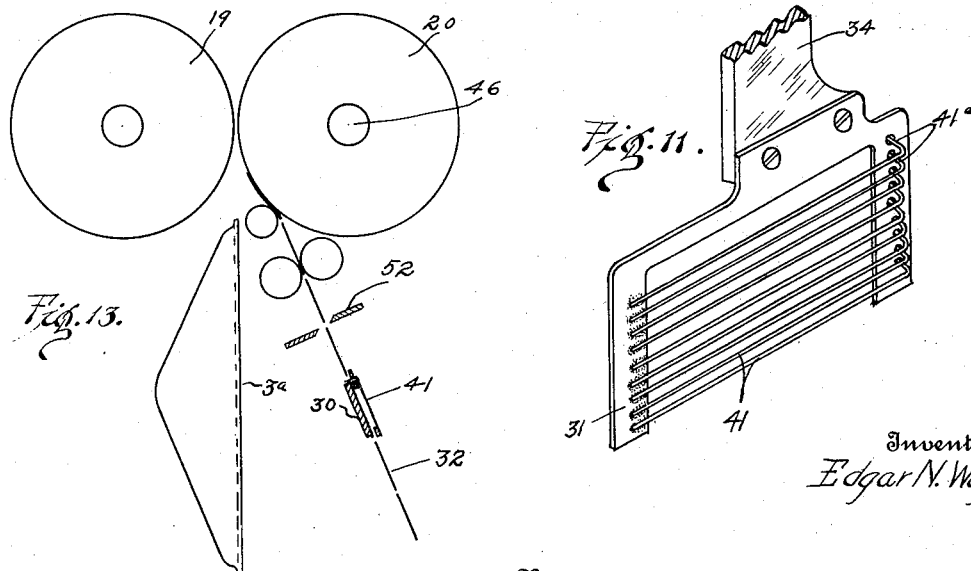
Inventor
Edgar N. Weyer

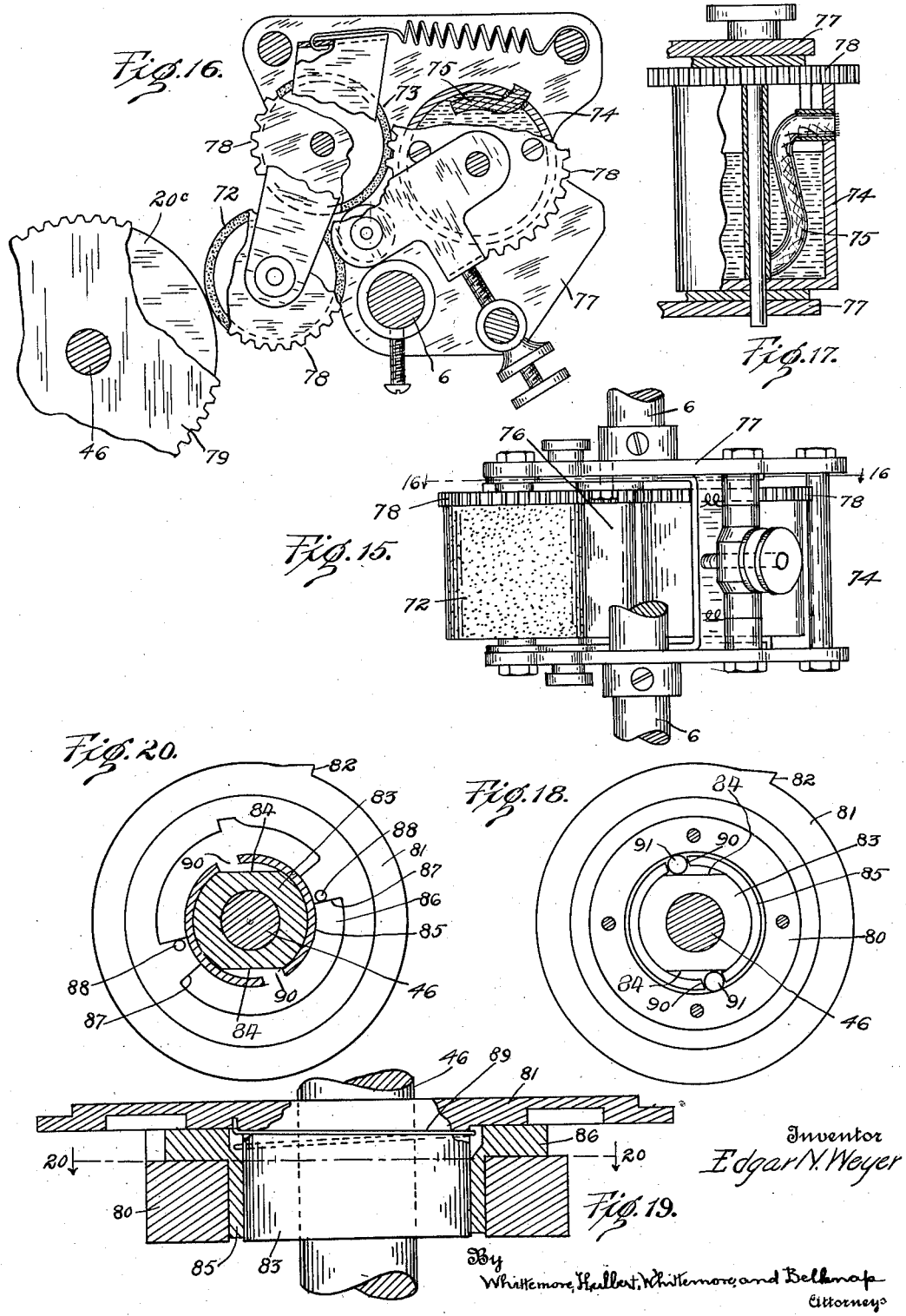

Sept. 15, 1925.                                                   1,554,054
                        E. N. WEYER
              ENVELOPE MAILING AND STAMPING MACHINE
                  Filed Nov. 14, 1921        9 Sheets-Sheet 9
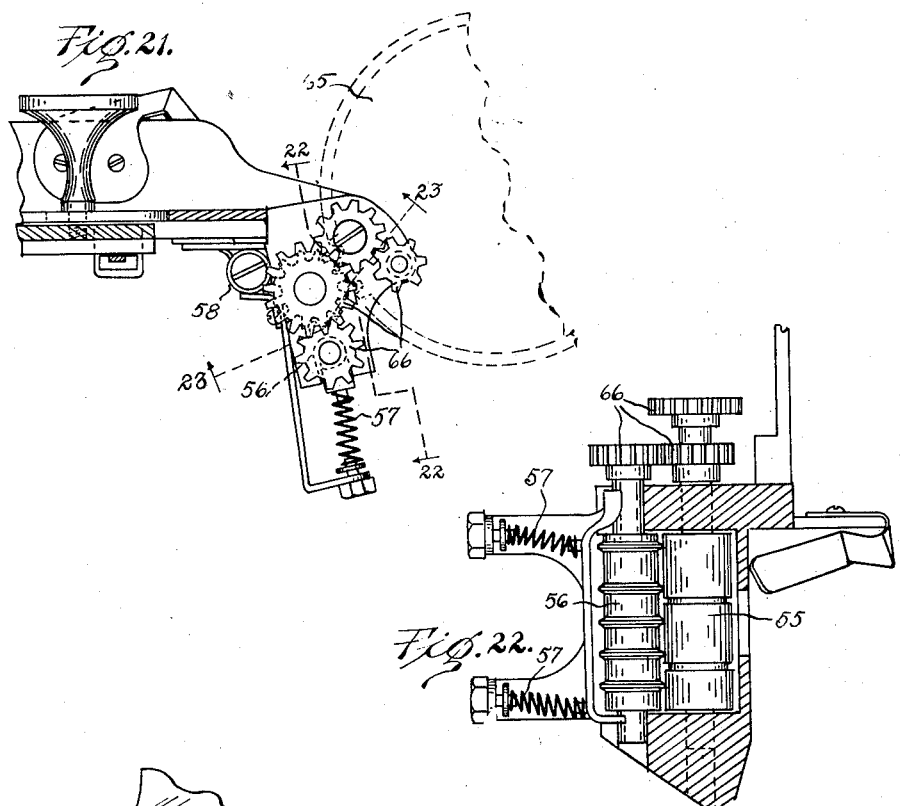
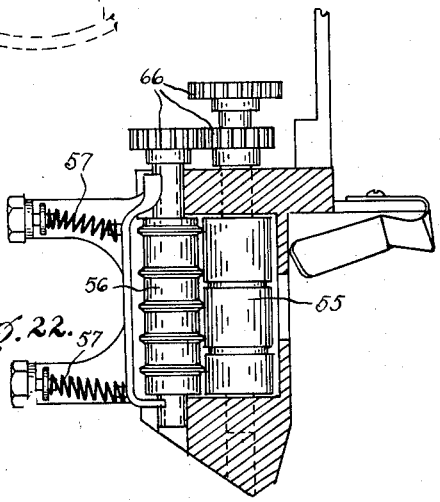
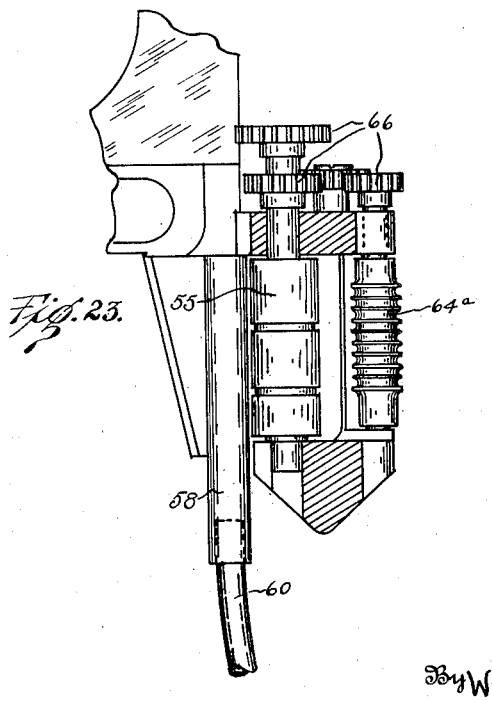
Inventor
Edgar N. Weyer
By Whittemore, Hulbert, Whittemore, and Belknap
Attorneys Patented Sept. 15, 1925.

1,554,054

UNITED STATES PATENT OFFICE.

EDGAR N. WEYER, OF DETROIT, MICHIGAN, ASSIGNOR, BY MESNE ASSIGNMENTS, TO PITNEY-BOWES POSTAGE METER COMPANY, OF STAMFORD, CONNECTICUT, A CORPORATION OF DELAWARE.

ENVELOPE MAILING AND STAMPING MACHINE.

Application filed November 14, 1921. Serial No. 514,876.

*To all whom it may concern:*

Be it known that I, EDGAR N. WEYER, a citizen of the United States of America, residing at Detroit, in the county of Wayne and State of Michigan, have invented certain new and useful Improvements in Envelope Mailing and Stamping Machines, of which the following is a specification, reference being had therein to the accompanying drawings.

This invention relates to envelope sealing and stamping machines and is an improvement upon the machine disclosed in Patent No. 1,146,902, patented July 20, 1915 by J. J. Schermack. The invention consists in various features of the construction, the primary feature being the provision of means for pre-canceling stamps, as well as affixing the same to the envelopes.

It is one of the objects of the invention to employ a common means for sealing the moistened envelope flaps, affixing the stamps and pre-canceling the latter.

In the drawings:

Fig. 1 is a plan view of the improved machine;

Fig. 1ª is a detail plan view of a unit comprising feed and delivery tables for the envelopes and a guide rail for the same;

Fig. 2 is a view of the machine in side elevation;

Fig. 3 is a cross-section view taken on line 3—3 of Fig. 1 and primarily disclosing the flap moistening means;

Fig. 4 is a bottom view showing the drive gearing;

Fig. 5 is an enlarged plan view of the stamp-feed mechanism;

Fig. 6 is a view of the same in side elevation;

Fig. 7 is a vertical sectional view of the stamp-feed mechanism taken on line 7—7 of Fig. 6;

Fig. 8 is a detail view of the stamp-severing means;

Fig. 9 is a cross-section on line 9—9 of Fig. 1 disclosing the rolls which seal the flaps and affix and cancel the stamps;

Fig. 10 is a cross-section through one of said rolls taken on line 10—10 of Fig. 9;

Fig. 11 is a detail perspective view of one of the complementary stamp feeding jaws;

Fig. 12 is a view of the trip mechanism with the overlying housing for the stamp-feed mechanism removed;

Fig. 13 is a diagrammatic view showing the angular relation in which the envelopes and stamps are fed toward each other by the machine;

Fig. 14 is a view in sectional elevation showing the force feed water supply means for the stamp moistening rolls;

Fig. 15 is a view in side elevation of the unit formed by the inking rolls for the type drum, and the drive gearing and supporting frame for the same;

Fig. 16 is a sectional view of the same taken on line 16—16 of Fig. 15;

Fig. 17 is a view in side elevation and partial section of the ink reservoir roll;

Fig. 18 is a cross-section on line 18—18 of Fig. 9 showing one of the clutches;

Fig. 19 is an axial sectional view of the same taken on line 19—19 of Fig. 18;

Fig. 20 is a cross-section view of the clutch taken on line 20—20 of Fig. 19;

Fig. 21 is a horizontal section taken on line 21—21 of Fig. 6 showing the gearing driving the stamp moistening rolls;

Fig. 22 is a cross-section on line 22—22 of Fig. 21; and

Fig. 23 is a cross-section on line 23—23 of Fig. 21.

Fig. 24 is a detail view of the outlet portion of the tube delivering water to the stamp moistening rolls.

*Envelope feeding and sealing means.*—In said views there is shown in combination, means for advancing envelopes rectilinearly through the machine, means for moistening the envelope flaps, intermittently operable stamp-feed mechanism, and a common means for sealing the envelope flaps, affixing the stamps, pre-canceling the same, and post-marking the envelopes.

In detail, 1 is the base of the machine, and 2 and 3 respectively designate feed and delivery tables for the envelopes 3ª, arranged respectively above the front and rear ends of said base, and connected in a unitary relation by a channel-shaped guide rail 4. From said rail, a pair of arms 5 project laterally to respectively engage posts 6, being positioned upon said posts by set screws 7, whereby the unit comprising parts 2, 3 and 4 may be vertically adjusted to accommodate various sizes of envelopes. To facilitate the vertical adjustment of said unit, a lever 8 (see Figure 3) is intermediately pivoted, as indicated at 9, one end of said lever forming a handle 8ª, and the other end engaging in a socket member 9ª carried by the central portion of the rail 4. When the screws 7 are loosened the unit 2, 3 and 4 may be readily actuated up or down by rocking the lever 8.

Adjacent the feed-table 2, there is arranged an initial feed-roll 10, against which the envelopes 3ª, disposed on edge upon said table, are pressed, as is best shown in Figure 1. Each envelope, as it comes into contact with said roll, is advanced thereby into engagement with a pair of reversely driven rolls 11 and 12, the former serving to continue the travel of the previously advanced envelope along the guide rail 4, and the latter acting to reject any other of the envelopes tending to feed forward at the same time. Beyond the rolls 11 and 12, flap-moistening mechanism is arranged at one side of the guide rail 4, and two pairs of rolls 13 and 14 are provided for advancing the envelopes along said rail, while engaged with the flap-moistening means. Said moistening mechanism comprises an inclined dished disk 15, constantly driven through a pair of bevel gears 15ª and a vertical shaft 15ᵇ, the lower portion of said disk being immersed in water in a tank 15ᶜ. The flaps of the envelopes in passing above said disk are pressed firmly into contact therewith by a plurality of disks 16 independently rotatable upon a shaft 16ª mounted in a bearing member 16ᵇ and held apart on said shaft by spacers 16ᶜ. A guide member 17 is arranged adjacent the disk 15 to maintain the envelopes upright and to guide the flaps thereof into proper contact with the disk. Having been advanced by the rolls 13 and 14 beyond the flap moistening mechanism, the envelopes pass between a pair of flap-sealing rolls 19 and 20, the former of which is constantly driven, while the latter comprises constantly driven upper and lower units 20ª and 20ᵇ, and an intermediate intermittently driven unit 20ᶜ. Beyond the rolls 19 and 20 the envelopes are advanced by a pair of final feed rolls 22, engaging only the lower portions of the envelopes and delivering the latter to the table 3 where they are laterally shifted by a constantly driven rotative stacker 23, forming a pile against a backing plate 24.

*Stamp feeding mechanism.*—The stamp-feeding mechanism is arranged within a housing 25 having a detachable upper portion 25ª formed with a glass panel 25ᵇ, said housing being mounted fast upon a pair of standards 26 and 26ª rising from the base 1. Within one end of said housing, a stamp reel or drum 27 is journaled upon a pin 28 rising from the floor of the housing. Between said drum and the rolls 19 and 20 there is mounted within said housing a frame or standard 29 carrying a pair of reciprocatory copivotal jaws 30 and 31, and a stamp strip 32 unwinding from said drum and angularly approaching the plane of travel of the envelopes, engages between said jaws and is adapted to be advanced, through reciprocation thereof. Each advance of the strip serves to engage the terminal stamp thereof successively with a severing means and a stamp moistening mechanism prior to delivery of said stamp to an envelope engaged by the rolls 19 and 20. Said jaws 30 and 31 are carried respectively by the lower ends of arms 33 and 34 pivotally connected at 35 to permit the jaw 31 to be swung out from the jaw 30 to release the stamp strip during return of the jaws to their normal position, subsequent to a forward feeding of said strip. Outward swinging of the jaw 31 is resisted by a spring 35ª coiled upon the pin 35. The jaw 30 is guided within a slot 36 formed in the lower portion of the standard 29, and is further guided by a pair of spaced bearings 37 upon the upper extremity of the arm 33 which bearings slidably engage a rod 38 mounted in the upper portion of the frame 29. It is essential that the stamp strip be advanced, during each actuation, a distance exactly equal to the width of a stamp, and it is further essential that the jaws engage the strip in a definite relation to the perforations 40ª thereof. These results are secured by providing upon the pivotal jaw 31 a plurality of spring feed wires 41 having bent end portions 41ª, urged by the tension of said wires into engagement with the stamp strip 32, and adapted to enter any line of perforations 40ª registering with said ends. This arrangement automatically insures a correct feed of the stamps. For reciprocating the jaws 30 and 31 a connecting rod 42 is pivotally engaged at one end with one of the bearings 37 as indicated at 43, the other extremity of said connecting rod being rigidly engaged with an eccentric strap 44 engaging an eccentric 45 loosely journaled upon the shaft 46 of the roller 20. Thus, upon establishment of said shaft in driving engagement with said eccentric, as will hereinafter be described, reciprocation of the jaws 30, 31 will be effected by said connecting rod. As the forward feed of the stamp strip is completed, the jaw 31 is rocked upon its pivot 35 to release said jaw from the stamp strip, this movement being accomplished by engagement of a pin 47$^a$ upon a projecting extremity of the connecting rod 42 with the upper end portion of the pivotal arm 34. The arrangement is such that said jaw 31 is held by the connecting rod disengaged from the stamp strip until the return stroke of the jaws is completed and the eccentric and connecting rod are in an intermediate position. The stamps, as applied to the envelopes are counted by an ordinary counter 47$^b$ mounted upon one end of the frame 29, said counter being actuable through a pitman 47$^c$ extending to one of the slide bearings 37.

*Stamp severing mechanism.*—To the eccentric 45 there is rigidly secured a cam disk 48 likewise loose upon the shaft 46, a marginal portion of said disk being downwardly deflected as indicated at 49. Said disk is marginally engaged between a pair of anti-friction rollers 50 carried by the free end of any arm 51 formed integral with the upper extremity of a shearing blade 52 pivoted at 53 upon the forward end of the standard 29. A blade 54 stationary upon the frame 29 coacts with the pivotal shearing blade 52, the stamp strip 32 being fed between said blades. Normally said blades occupy the divergent relation shown in full lines in Fig. 8. When, however, the depressed portion 49 of the cam disk 48 engages the rollers 50, the blade 52 is rocked toward the companion blade 54 to effect shearing of the interposed stamp strip. The arrangement of the cam disk 48 with respect to the eccentric 45 is such that the shearing operation occurs at the moment of completion of the stamp advancing stroke of the jaws 30 and 31 and the shearing blades are so positioned with relation to the stamp feeding wires 41 as to insure engagement of said blades with the line of perforations 40$^a$ formed at the juncture of the terminal stamp with the strip 32.

*Stamp moistening mechanism.*—The severed stamp just prior to completion of the severing operation, is engaged between a stamp moistening roller 55 and a coacting presser roller 56, the latter being urged toward the moistening roller by a pair of coiled springs 57. Adjacent to the moistening roll 55 there is vertically disposed a tube 58 closed at its upper end and formed with a longitudinal slot 59 opening toward said roll 55. Said tube at its lower end is connected with a flexible tube 60 leading into a water supply tank 61 secured upon the base 1, said tube communicating within said tank with the outlet 61$^a$ of a rotary pump 62 of any suitable construction. The pump is adapted to be continuously driven through a pair of gears 63 one of which is mounted upon the shaft 63$^a$ actuating one of the rolls 14, and the other of which is fast upon the pump shaft 64, the latter being extended above the tank 61. As the moistened stamp leaves the rolls 55 and 56, it engages between a final feed roll 64$^a$ and the intermittently driven element 20$^c$. A gear 65 having a unitary connection with the eccentric 45 and cam disk 48 acts through a gear train 66 to drive the several rolls 55, 56 and 64$^a$ of the stamp moistening mechanism. The pump 62 delivers a constant supply of water through the tube 60 to the slotted tube 58, and the slot 59 of the latter is so proportioned as to eject upon the moistening roll 55 an adequate supply of water for moistening the stamp. Any excess of water delivered to said roll drips down and is returned to the tank 61.

*Stamp affixing and canceling means.*—The intermediate element 20$^c$ of the roll 20 may be termed a type drum, and is embraced throughout a portion of its circumference by a rubber facing 68 upon which is formed a series of spaced circumferential ribs 69. At a suitable point the facing 68 is apertured to permit the introduction and removal of a cylindrical insert member 70 which is fitting radially into the drum 20$^c$, and carries upon its outer end type 71 circumferentially flush with the ribs 69 (see Fig. 10). 72 is an inking roller bearing upon the type drum 20$^c$ and applying ink to the ribs 69 and type 71 so that the former may imprint cancellation marks upon the stamp, and the latter may imprint a postmark upon the envelope. Ink is applied to the roller 72 from a platen roller 73, the latter deriving the ink from the reservoir roller 74 within which is disposed a wick 75 projecting at its upper end laterally from said roller and adapted to bear upon the upper portion of the platen roller. Intermediate its points of engagement with said wick and with the inking roller, the platen roller is engaged by an ink spreading roller 76. All of the rollers 72, 73, 74 and 76 are mounted in a frame 77, and are driven through a gear train 78 from a gear 79 carried by the upper end of the type drum 20$^c$.

*Clutches.*—The gear 65, cam 48 and eccentric 45 form a unit loose upon the shaft 46 and adapted to be established in driven engagement with said shaft by a suitable clutch, and the type drum 20$^c$ and gear 79 form another unit loose upon said shaft and similarly adapted to be established in driven engagement with the shaft. The two clutches respectively comprises rings 80 and 80$^a$, the ring 80 being secured to the upper constantly driven member 20$^a$, and the ring 80ᵃ being set into the upper end of the lower constantly driven member 20ᵇ. Adjacent to each of said rings there is provided a clutch disk 81 having a radial tooth 82, and formed with a hub 83 engaging centrally in the adjacent ring 80 or 80ᵃ, said hub being beveled as indicated 84 at diametrically opposed points. Within each ring 80 or 80ᵃ there is further engaged a sleeve 85, embracing the corresponding hub 83, and formed adjacent the clutch disk 81 with a flange 86 which is notched as indicated at 87 at diametrically opposed points. A pair of pins 88 carried by the clutch disk 81 project transversely of said disk respectively into the notches 87, the width of said notches being such as to provide for a limited relative rotation between the clutch disks and the adjacent flange sleeves. A spring 89 is coiled between each hub 83 and the adjacent sleeve 85 exerting a rotative effort upon said sleeve tending to take up the lost motion provided for between said sleeve and the adjacent disk 81. Each sleeve 85 is formed with a pair of diametrically opposed slots 90 opposite the beveled faces 84 of the hub member 83, and within each of said slots there is retained a roller 91. The tendency of the spring 89 acting upon the flange sleeve 85 is to carry the rollers 91 toward opposite ends of the beveled faces 84 so as to frictionally lock said rollers in engagement with the associated hubs 83 and the embracing ring 80 or 80ᵃ. Upon each flange 86 a radial tooth 92 is formed providing an abutment engageable to slightly rotate the flange sleeve 85 in position to the spring 89 so as to shift the rollers 91 to positions substantially central with respect to the beveled faces 84 in which positions said rollers may rotate freely without establishing any driving interlock between the driven rings 80 or 80ᵃ and the hub member 83.

*Trip mechanism.*—Describing now the trip mechanism whereby each envelope, in its travel between the flap moistening mechanism and the sealing rollers 19 and 20, initiates operation of the various intermittently driven mechanisms. 93 is a vertical rock shaft journaled adjacent the roll 20 and carrying a pair of detent arms 94 normally engaging the teeth 92 of the flanges 86 to establish a non-driving position of the clutches. A spring 95 coiled upon said rock shaft urges the latter rotatively in a direction to engage the detent arms 94 with the flanges 86. From the lower end portion of said rock shaft there projects rigidly an arm 90 extending above a plate 97 arranged beneath the stamp housing 25 and carrying the main elements of the trip mechanism. Said arm 90 carries upon its free end a pivoted member 98 normally maintained by a spring 98ᵃ in the position disclosed in full lines in Figure 12. For actuating the arm 90 to rock the shaft 93 and disengage the detent arms 94 from the teeth 92, there is pivotally mounted upon the plate 97 a tripping plate 99 acted upon by a spring 95 urging said plate normally to the position shown in Fig. 12, in which position said plate abuts against a stop 100 upon the plate. The tripping plate 99 carries a trigger 102 which normally projects into the path of the advancing envelopes, said trigger being successively engageable by the forward edges of the envelopes 3ᵃ to effect rocking of said tripping plate and thereby engage a pin 102ᵃ thereupon with the pivot member 98 to rock the arm 90. It is preferred to mount said trigger upon the tripping plate by attaching the trigger to a link 102ᵇ connecting a pair of parallel arms 103 pivoted upon the tripping plate. One of the pins 104 connecting said arms to said link is downwardly extended into a slot 105 in said tripping plate to limit swinging of said arms. The coil spring 106 acts upon one of said arms to maintain the same and the trigger 102 normally in the position disclosed in full lines in Fig. 12. Thus it is seen that, through a lost motion engagement with the tripping plate 99, the trigger is adapted to undergo slight bodily movement transverse to the plane of travel of the envelopes independently of said tripping plate. The provision of this lost motion permits the envelopes to travel through the machine in a more rapid succession since it permits the tripping plate, after the trigger is released by the forward edge of an envelope, to temporarily rock to the dash line position shown in Fig. 12 in which position it is maintained by the engaged envelope. As soon as said envelope has cleared the trigger, the latter is thrown by the spring 106 to its normal position in readiness for engagement by the following envelope. Thus a portion of the return movement of the trigger to its normal position is effected while said trigger is still in engagement with the envelope whereby it has been tripped, and the time interval occupied in completing the return movement of the trigger to its normal position is minimized, permitting the feeding of the envelopes in a close succession.

As a provision for rendering the tripping mechanism inoperative when desired, a rocker plate 107 carrying an upstanding pin 109 is mounted upon the plate 97, which pin upon rocking of said plate 107 in the direction of the arrow in Fig. 12, is engageable with the pivot member 98 to rock the latter out of the path of movement of the pin 102ᵃ, as shown in dash lines in Fig. 12. For maintaining said dash line position the rocker plate 107 is engageable by a pin 111 vertically slidable in the bottom plate of the housing 25, (see Fig. 6) a knob 111ᵃ being provided upon said pin within the housing 25, and a spring 112 being mounted upon the pin below said housing urging the pin downwardly. When the said pin is raised by means of the knob 111ª a spring 112ª returns the rocker plate 107 to its normal position disclosed in full lines in Fig. 12, thus releasing the pivot member 98 and permitting the coacting spring 98ª to shift the same into position for engagement by the pin 102ª.

Beneath the base 1 is arranged the gearing 113 whereby the various described rollers and shafts are driven. As a driving means a motor 114 may be also mounted below said base.

*Operation.*—Considering now the operation of the machine as a whole, it is to be understood that a stack of envelopes to be fed through the machine is disposed vertically upon the feed table 2, (see Fig. 1) the flaps of said envelopes being arranged in overlapping relation preferably deflected somewhat out from the envelopes to facilitate their engagement with the moistening disk 15. The envelope adjacent the initial feed roller 10 is actuated thereby upon the guide rail 4 where its advance is continued by the feed roll 11. The roll 12 rotating reversely to the roll 11 will reject any envelopes tending to advance simultaneously with that engaging the rolls 10 and 11. Beyond the rolls 11 and 12 the envelope is engaged by the guide 17 which directs the flap of said envelope into engagement with the moistening disk 15. In traveling past said disk the envelope is advanced by the two pairs of feed rolls 13 and 14 and the gummed surface of the flap is pressed into firm contact with the moistening disk by the series of coaxial disks 16. The disk 15, since it is constantly rotating and its lower portion is immersed in water within the tank 15ᶜ, presents a constantly moist surface to the successively engaged envelope flaps. Beyond the flap moistening means the forward edge of the advancing envelope engages the trigger 102 shifting the latter from its path and thereby operating the trip mechanism whereby the several intermittently driven mechanisms are set in operation. These mechanisms comprise the stamp feeding mechanism, the stamp severing mechanisms, the stamp moistening mechanism, the stamp affixing and canceling drum, and the inking mechanism. The trigger 102 is so spaced with relation to the drum 27 that a stamp is advanced, severed from the strip 32, and moistened, as the envelope passes from the trigger 102 into engagement with the rolls 19 and 20 so that said stamp is in proper position to be affixed to said envelope as the forward portion of the latter passes between said rolls. Also the intermittent rotation of the type drum 20ᶜ is so timed with respect to the travel of the envelope and that of the stamp that the pre-canceling ribs 69 engage the envelope in proper position to effect cancelation of the stamp. Also the postmark applied to the envelope by the type 71 is properly spaced upon the envelope with relation to the stamp. Upon advancing beyond rollers 19 and 20 the sealed and postmarked envelope with pre-canceled stamp affixed is delivered by the final feed rolls 22 to the delivery table 3 where the envelopes are stacked against the backing plate 24 by the rotative stacker 23.

The described machine may also be employed for sealing envelopes and affixing the stamps omitting the pre-canceling operation, this being accomplished simply by omitting any delivery of ink to the type drum. If it is desired to omit the flap sealing operation it is necessary only to remove the water from the flap moistening tank 15ᶜ.

The described machine may, moreover, be employed for imprinting mailing permits upon envelopes by providing suitable type upon the type drum 20ᶜ and by throwing the stamp feeding mechanism out of operation by means of the rocker plate 107.

What I claim as my invention is:

1. The combination with continuously driven mechanism for advancing an envelope, of stamp moistening, affixing, and canceling mechanism, and a single trip mechanism exercising a common control over said stamp moistening, affixing, and canceling mechanism and operable by the advancing envelope.

2. The combination with stamp and flap moistening mechanism, of a common means for sealing the flap, affixing the stamp and canceling the stamp.

3. The combination with stamp and flap moistening mechanism, of a common means for sealing the flap, affixing the stamp and canceling the stamp, and means for delivering the moistened stamp to the envelope as it passes into engagement with said common means.

4. In a machine of the character described, the combination with a flap sealing mechanism and mechanism for applying and canceling a stamp, of means operated by the envelope, passing through the machine, for effecting the cooperative action of said mechanisms.

5. In a machine of the character described, the combination with flap moistening mechanism, of a continuously revolving sealing roll, mechanism for intermittently delivering stamps to said roll and cancelling the same, means for feeding an envelope to said roll, and means operable by the advancing envelope for controlling and timing said intermittent mechanism.

6. The combination with a constantly revolving sealing roller, and stamp canceling means carried by said roller, of means for successively feeding envelopes to said roller, and means controlled and timed by the advancing envelope for delivering a stamp to said sealing roll so as to be rolled by said stamp canceling means into engagement with the envelope.

7. The combination with flap moistening mechanism, of a pair of rolls between which the envelope is passed to seal the flap, and means carried by one of said rolls for marking envelopes in their travel between said rollers.

8. The combination with flap moistening mechanism, of stamp feeding, severing and moistening mechanisms, a pair of rolls between which the envelope is fed to seal the flap, means for delivering the severed and moistened stamp to an envelope as the latter passes between said rolls, and means carried by one of said rolls for canceling the stamp, as the same is advanced, with the envelope, between the rolls.

9. The combination with flap moistening means, of a pair of rolls for sealing the flap, normally inoperative stamp-feeding, moistening, and canceling mechanisms, and a trip for causing the operation of said mechanisms actuated by the forward end of the envelope, whereby the moistened stamp is attached to said envelope and canceled as the envelope passes between said rolls.

10. The combination with stamp and flap moistening means, of a pair of rolls between which the envelope is passed to seal the flap and affix a stamp, means for delivering the moistened stamp to the envelope as it passes between said sealing rolls, and means carried by one of said rolls for canceling the stamp as the same is advanced, with the envelope, between the rolls.

11. The combination with an envelope advancing roll and a coaxial rotative stamp canceling member, of means for constantly driving the envelope feed roll, intermittently operable mechanism for driving the stamp canceling member, and trip mechanism in advance of said feed roll operable by the advancing envelope and controlling said intermittent mechanism.

12. The combination with envelope feeding means, of stamp feeding and moistening means, a constantly driven envelope feed roll, a coaxial rotative stamp affixing and canceling element, a coaxial rotative actuating element for said stamp feed mechanism, clutches between said feed roll and the said coaxial elements, and means controlled by the advance of the envelope for intermittently closing said clutches.

13. The combination with mechanism for advancing an envelope, of intermittently operable stamp affixing and canceling means, a common drive connection to said stamp affixing and canceling means, a clutch controlling said drive, and a trip for said clutch operable by the advancing envelope.

14. The combination with continuously driven rolls for advancing an envelope, of a stamp canceling element coaxial with one of said rolls, intermittent drive means for said canceling element, and a trip operable by the advancing envelope controlling said drive means.

15. In a mail marking machine, a printing member, drive means for said member, a clutch controlling driving of said member, trip mechanism controlling said clutch and operable by mail matter moving through the machine, and means for manually adjusting an element of said trip mechanism to prevent control of the clutch through said mechanism.

16. The combination with an intermittently rotative printing member, of a coacting rotative inking member, means driving said members in a positively timed relation, means for advancing work to said printing member, and a trip mechanism under control of the advancing work and exercising control of the drive to said printing member and inking member.

17. The combination with a rotative printing member and a coaxial feed roller, of means for constantly driving said feed roller, drive means for said printing member, and a trip mechanism controlling said drive means actuable by the work in its advance to said printing member and feed roll.

18. In a mail marking machine, a printing member, a support upon which mail matter travels to said printing member, and a member engaged with said support angularly actuable to shift said support parallel to the axis of the printing member.

19. In a mail marking machine, a printing member rotatable about a vertical axis, a support upon which mail matter travels to said printing member, and a member engaging said support angularly actuable to raise and lower said support.

20. The combination with means for advancing an envelope, of stamp moistening, affixing, canceling and post-marking mechanism, and a single trip mechanism controlling said mechanism and operable by the advancing envelope.

21. The combination with stamp moistening mechanism; of a common means for affixing canceling and postmarking the stamp, and means for delivering the moistened stamp to an envelope as it passes said common means.

22. In a machine of the character described, the combination with mechanism for applying canceling and postmarking a stamp; of means released by the envelope passing through the machine for effecting the cooperative action of said mechanisms.

23. In a machine of the character described, the combination with mechanism for delivering a stamp to each envelope passing through the machine canceling the stamp and postmarking the envelope; means for feeding envelopes successively to said mechanism, and means operable by the advancing envelope for controlling and timing said mechanism.

24. The combination with revolving roll and stamp canceling and postmarking means carried by said roll; of means for successively feeding envelopes to said roll, and means controlled and timed by the advancing envelope for applying a stamp to the envelope to be canceled and postmarked.

25. The combination with stamp feeding, severing and moistening mechanisms; of means for feeding envelopes therepast, means for applying a severed and moistened stamp to the envelope as the latter passes, and means for canceling the stamp and postmarking the envelope during such passage.

26. The combination with stamp moistening means; of a pair of rolls between which an envelope is passed, means for delivering the moistened stamp to the envelope as it passes between said rolls, and means carried by one of said rolls for canceling the stamp and postmarking the envelope as it passes between the rolls.

27. In a machine of the character described, the combination with a revoluble roll, of mechanism for intermittently delivering stamps to said roll, means on the roll for canceling the stamp, means for feeding an envelope to said roll, and means operable by the advancing envelope for controlling and timing said intermittent mechanism.

28. The combination with a revoluble roll, and stamp canceling means carried by said roll; of means for successively feeding envelopes to said roll, and means controlled and timed by the advancing envelope for delivering a stamp in position to be rolled by said stamp canceling means into engagement with the envelope.

29. The combination with stamp feeding severing and moistening mechanisms; of a pair of rolls between which an envelope is fed, means for delivering the severed and moistened stamp to the envelope as the latter passes between said rolls, and means carried by one of said rolls simultaneously pressing the stamp onto the envelope and canceling the stamp as the same is advanced with the envelope between the rolls.

30. The combination with stamp moistening means, of a pair of rolls between which the envelope is passed, means for delivering the moistened stamp to the envelope as it passes between said rolls, and means carried by one of said rolls for simultaneously pressing the stamp onto the envelope and canceling the stamp as the same is advanced with the envelope between the rolls.

31. The combination with envelope feeding means, of stamp feeding and moistening means, a constantly driven envelope feed roll, stamp affixing and canceling means, actuating devices for said stamp feeding and moistening means, and a single trip mechanism controlling the operation of said stamp affixing and actuating means, and controlled by the advance of the envelope.

32. The combination with an envelope advancing roll and a coaxial rotative stamp canceling member, of means for driving the envelope advancing roll, means for driving the stamp canceling member, and trip mechanism operable by the advancing envelope and controlling said stamp canceling member.

In testimony whereof I affix my signature.

EDGAR N. WEYER.